Feb. 25, 1930.　　　M. H. PADE　　　1,748,583
CONVEYER FOR USE IN THE MANUFACTURE OF INNER TUBES
Filed March 22, 1920　　5 Sheets-Sheet 1
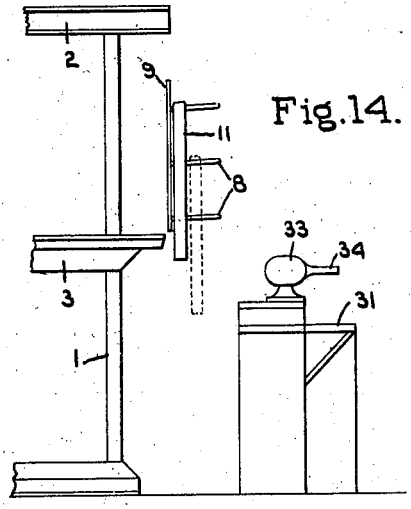
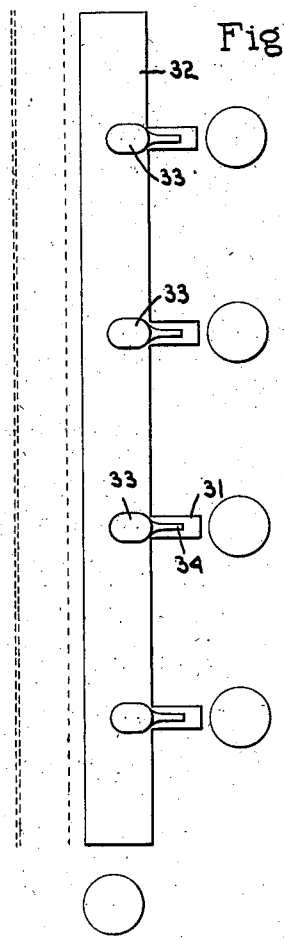
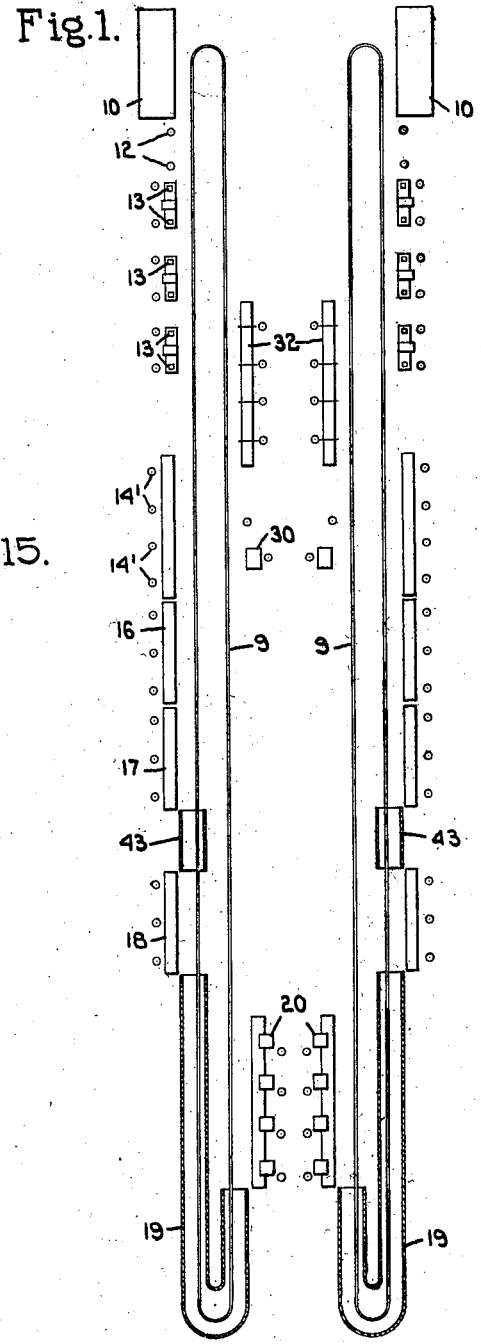
Inventor.
Max H. Pade Feb. 25, 1930.   M. H. PADE   1,748,583
CONVEYER FOR USE IN THE MANUFACTURE OF INNER TUBES
Filed March 22, 1920   5 Sheets-Sheet 2
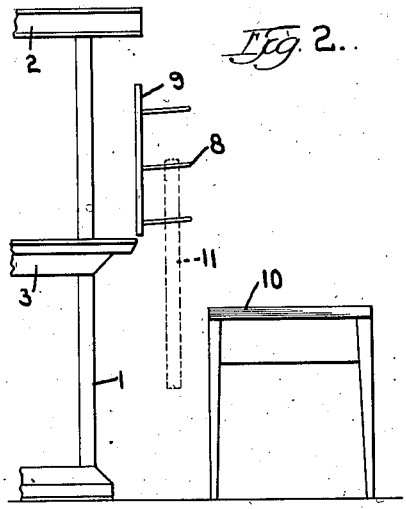
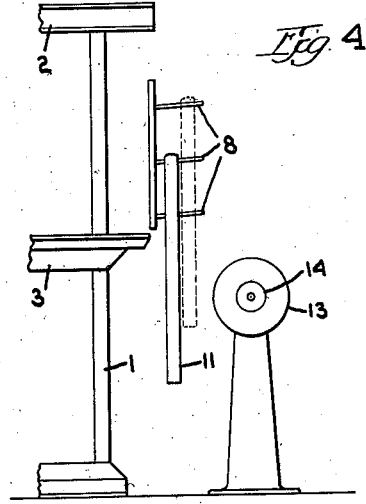
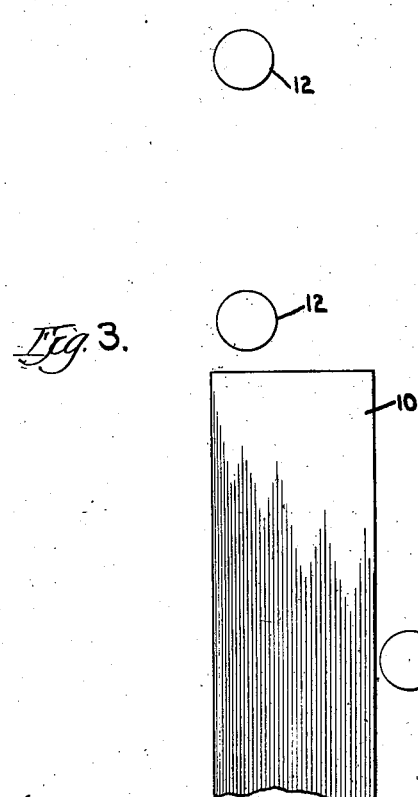
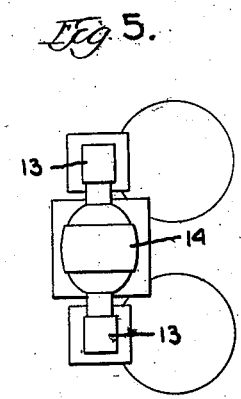
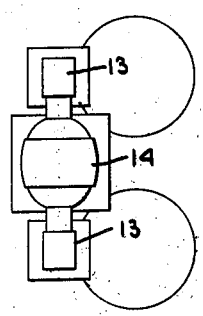
Inventor:
Max H. Pade

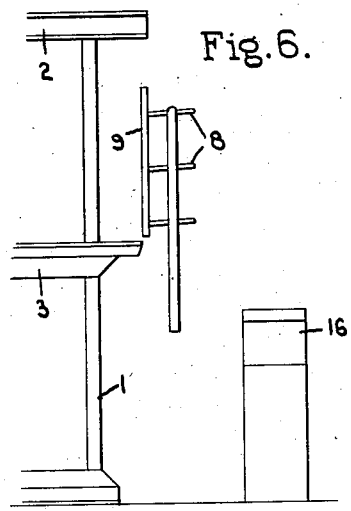
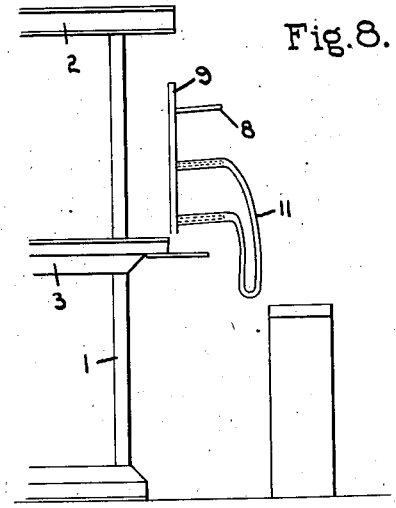
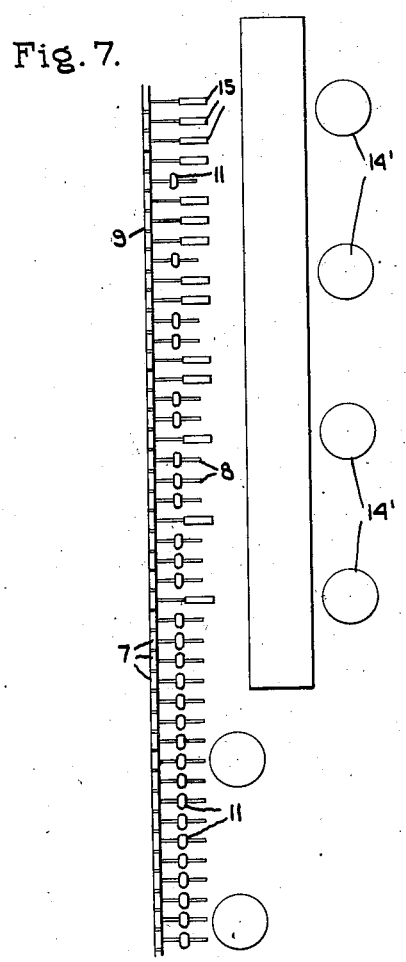
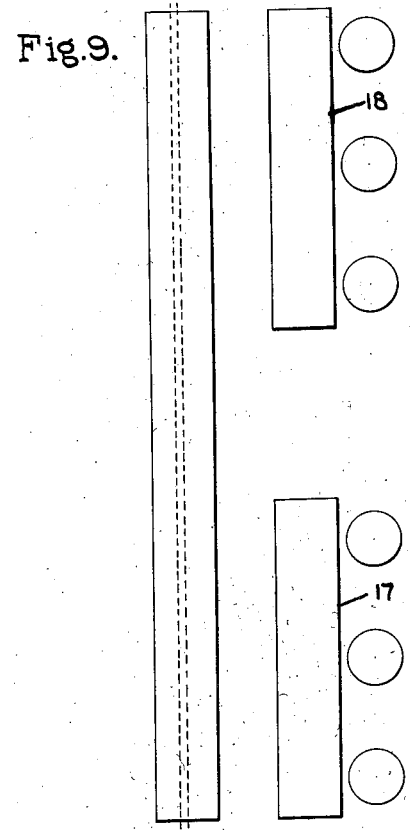

Feb. 25, 1930.     M. H. PADE     1,748,583
CONVEYER FOR USE IN THE MANUFACTURE OF INNER TUBES
Filed March 22, 1920     5 Sheets-Sheet 4

Inventor.
Max H. Pade
by G. L. Ely
Atty.

Feb. 25, 1930.            M. H. PADE                 1,748,583
          CONVEYER FOR USE IN THE MANUFACTURE OF INNER TUBES
                  Filed March 22, 1920        5 Sheets-Sheet 5
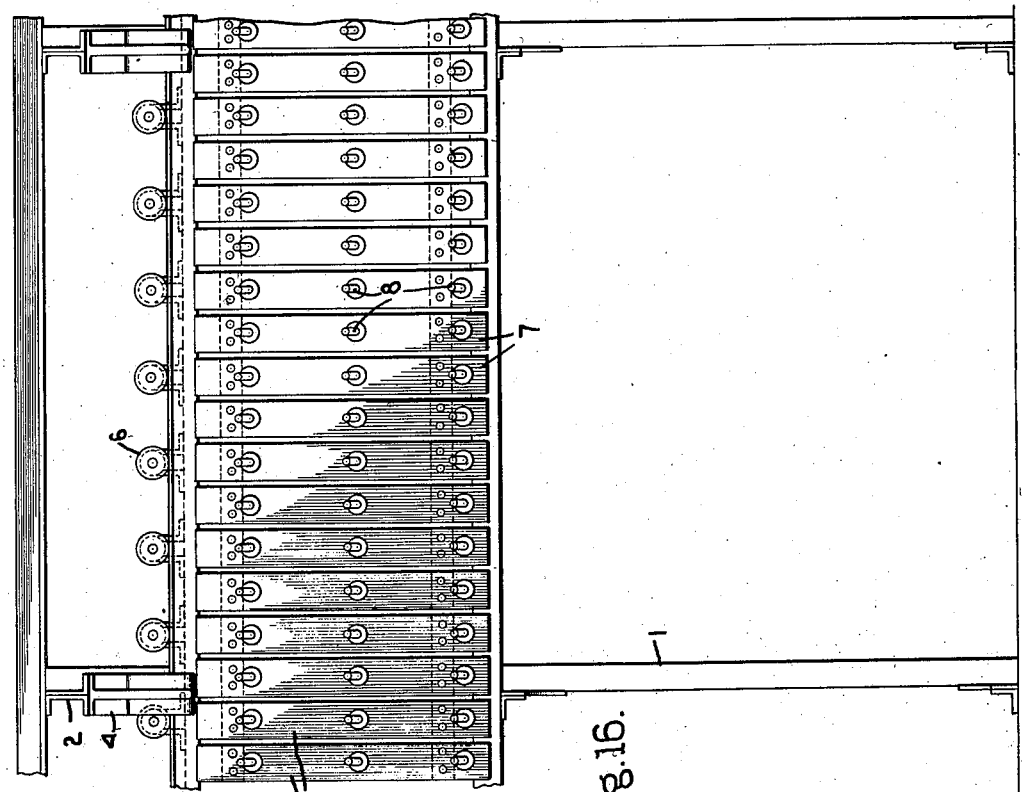
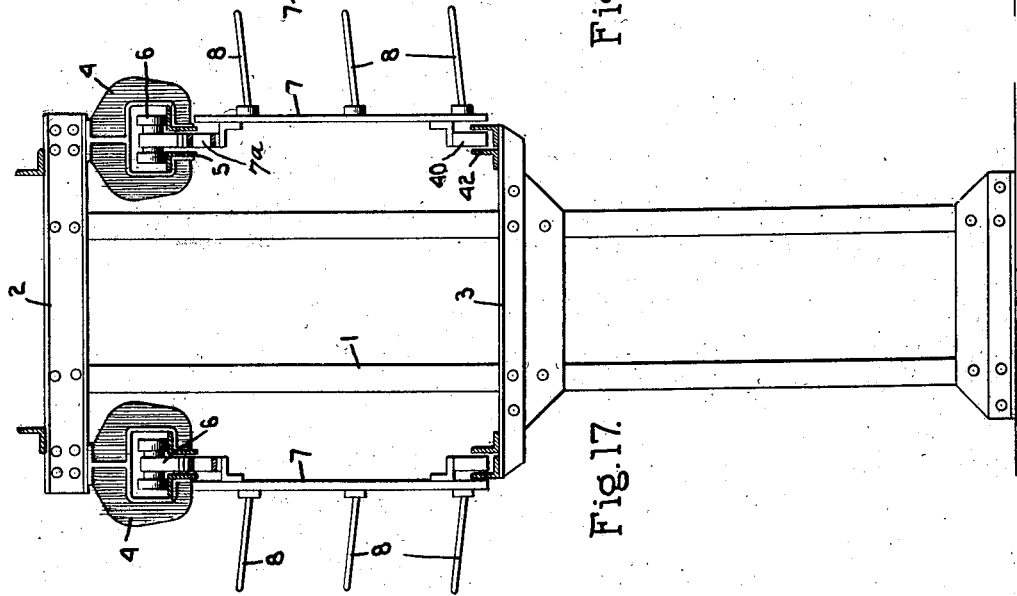
Inventor.
Max H. Pade
by G. L. Ely, Atty.

Patented Feb. 25, 1930

1,748,583

UNITED STATES PATENT OFFICE

MAX H. PADE, OF AKRON, OHIO, ASSIGNOR TO THE FIRESTONE TIRE AND RUBBER COMPANY, OF AKRON, OHIO, A CORPORATION OF OHIO

CONVEYER FOR USE IN THE MANUFACTURE OF INNER TUBES

Application filed March 22, 1920. Serial No. 367,845.

This invention relates to a conveyer mechanism for use in tire factories for the manufacture of inner tubes for pneumatic tires and the object of the invention is to construct an apparatus which will enable the tubes to be manufactured more rapidly and economically than has been possible heretofore, and at the same time more uniform work is assured.

The operations which this conveyer is designed to facilitate are those operations which take place after the tube has been cured, removed from the mandrel on which it was built, and aged. The final step in the production of the tube is the uniting of the ends to make the continuous air chamber. This final step required a number of operations which have been formerly done by a few men who performed several of the operations. By the use of the mechanism here shown, the several operations are performed on the tubes in sequence by different operators, the tubes being carried by the conveyer from one operator to the next, the spacing of the operators and the speed of the conveyers being such that sufficient time is allowed to elapse between the different operations and the men are given enough time to do their work carefully and accurately. The transportation and handling of the tubes is reduced and a larger number of tubes can be manufactured in a given floor space and with a given number of operators than has been possible heretofore.

Before entering into a detailed description of the apparatus, a brief account of the various steps in the splicing of tubes will enable a clearer understanding of the invention to be obtained.

Tubes are usually cured on straight or curved poles and when stripped from the poles or mandrels are in the form of open ended tubes.

1. The first operation in splicing or joining the ends of the tube is to measure the tube, trim the ends and punch the valve hole.

2. One end of the tube is now turned back the required distance, an operation known as "cuffing."

3. The tube is now buffed or roughened on the "cuffed" end and on the uncuffed end. By this operation two surfaces are prepared which are subsequently brought together to join the tube.

4. The ends of the tube are next placed on the blower and form. These are implements well known in the art and will not be described in detail here, it being sufficient to state that they are metallic forms placed on the tube ends, which remain with the tube until the splice is made. On the blower and form are exposed the ends of the tube which have been buffed and form the surfaces which adhere to complete the tube.

5. The exposed ends of the tube are then washed with some rubber solvent, and

6. A first coat of rubber cement is applied.

7. A short time after a second coat of cement is applied and then the tubes are

8. Dried in a warmed chamber until the exposed ends are in a tacky condition. The tubes are now ready for the splicer.

9. This operator inserts the form in a clamping mechanism, washes both buffed and cemented ends of the tube with an acid curing liquid, places the blower over the form and with a jet of compressed air turns the cuff on the blower back over the other double cuffed surface on the form. The over-lapping ends are then wrapped with a short length of tape securely knotted. The tube is then allowed to rest for a sufficient length of time to enable the acid cure to set, and 10. Then the splicing wrap and form are removed.

11. At any point after the splicing operation, the valve stem which has been carried around in the tube since the blower and form were applied is pulled up into the valve hole.

12. The following operation consists in forcing the tube down over the valve stem and applying and tightening the nut on to the valve stem.

13. The final operation consists in inflating, inspecting, and testing the tube whereupon it is ready for the market.

The various operations are such as are carried out in the regular manufacture of inner tubes for automobile tires and the exact order of steps is not essential to this invention and may be varied or altered within mechanical skill. Furthermore, it will be understood that details of the mechanical structure or arrangement of parts may be modified without departing from this invention or sacrificing any of its benefits.

Fig. 1 is a plan view of an apparatus for use in splicing inner tubes, being shown in duplicate.

Fig. 2 is an elevation and Fig. 3 a plan of the apparatus where the first and second operations take place.

Figs. 4 and 5 are elevation and plan, respectively, where the third operation takes place.

Figs. 6 and 7 are elevation and plan, respectively, where the fourth operation takes place.

Figs. 8 and 9 are elevation and plan, respectively, where the sixth and seventh operations are performed.

Figs. 14 and 15 are elevation and plan, respectively, where the twelth operation is performed.

Fig. 16 is a side elevation and Fig. 17 a cross section of the conveyer mechanism showing its details.

Figure 10:
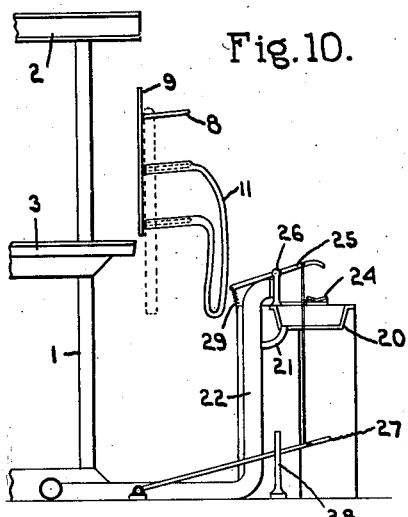
Figs. 10 and 11 are elevation and plan, respectively, where the ninth operation is performed.

In the drawings 1 denotes a framework or series of standards which support the conveyer mechanism. At the upper ends of the standards are located cross bars 2 and at about the midway point cross bars 3. The upper cross bars support a plurality of hangers 4 which carry angular rails 5. The rails support a plurality of trucks or carriages 6, from which depend a number of panels or slats 7, held in spaced relation by chain 7$^a$, and forming the conveyer 9. These panels are elongated and placed vertically in the manner shown, being provided with a plurality of pins 8, preferably three in number, which are inclined slightly upwardly. These pins are of sufficient length to support the forms or blowers which have been mentioned. The lower edges of the panels may be guided by fingers 40 engaging between guide rails 42 fixed to the cross bars 3.

The conveyer is propelled in any preferred manner, its rate of travel being adapted to the operations to be performed, and to allow the necessary lapse of time to ensue between operations.

Figure 12:
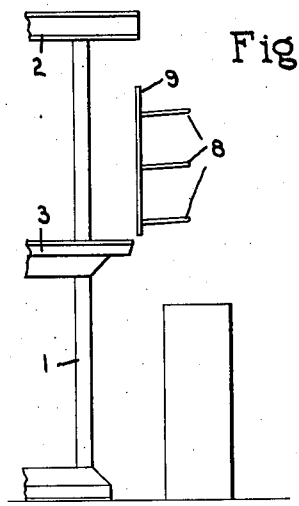
Figs. 12 and 13 are elevation and plan, respectively, where the tenth and eleventh operations are performed.
Figure 11:
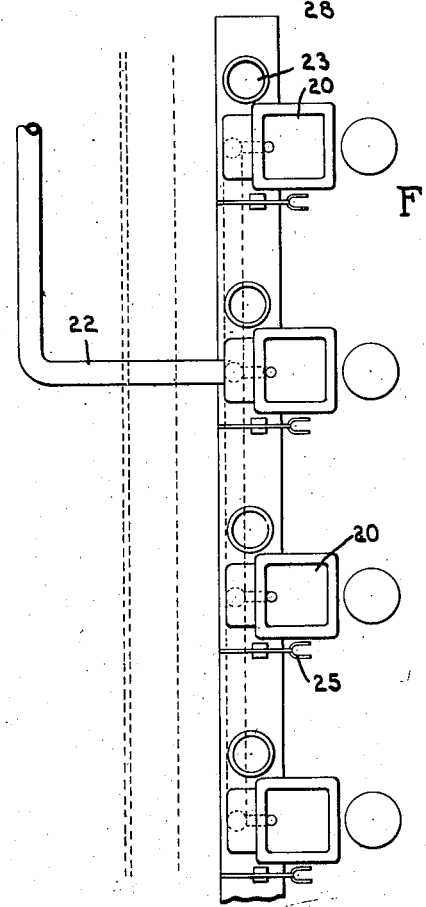
Figure 13:
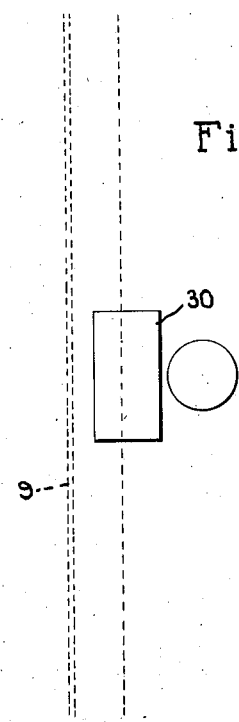

Referring now to Figs. 1 to 15 inclusive, the tube in straight or curved form after curing and ageing is measured, trimmed and the valve hole punched on a table 10 adjacent the conveyer 9. The tube 11 so prepared is hung on one of the pins 8 and the conveyer carries it to one of several operators standing at 12 who turn back the cuff on one end of the tube and replace the tube on the conveyer, by which it is carried opposite the buffing wheels or brushes 13 which are rapidly rotated by motors 14. Any number of these buffing wheels may be provided, and each buffing wheel operator removes a tube 11 from a peg and buffs the cuff and the other end of the tube.

It will be seen that the plurality of pins are of advantage as when a tube is cuffed it may be placed on one of the horizontal rows of pins, and when buffed may be placed on another row. This is useful in preventing the same tube being picked up for buffing a second time and in insuring any tube from escaping the buffing operation. The same principle may be carried out in the operation through the device and will be found to be beneficial.

The blowers and forms are now inserted in the ends of the tubes by operators 14' and the tubes returned to the conveyer. The blowers and forms are indicated by the numerals 15. A number of operators at table 16 now lift the tubes from the conveyer and wash the buffed ends, replacing them on the conveyer which moves them to and past tables 17 and 18 where operators apply the cement coatings replacing the tubes on pins 8. Between the tables 17 and 18 is a space sufficient to enable the first coat to dry slightly before the second is applied and at this point may be placed a short heater 43 which will aid in drying the first coat of cement.

The conveyer now carries the tube prepared for splicing through an oven 19 which is heated to the proper temperature and of a length sufficient to insure that the cement coating will become tacky.

Beyond the heater is located a series of splicing stands or stations. Each one of these stands contains a sink or basin 20 over which the acid from tank 23 is applied to the ends of the tube, a drain 21 to draw off the dripping acid, and an air exhaust 22 to remove the fumes from the acid curing. The tube to be spliced is removed from the conveyer and the form laid on an anvil 24 at the side of the sink. A clamping lever 25, pivoted at 26 is brought down by a foot lever 27 and the form is clamped in place, the lever being locked by a detent 28. A spring 29 elevates the clamping lever when the treadle is released.

While the form is held in position by the clamp, an operator coats both of the buffed ends with the acid curing liquid and then places the blower over the form and blows the cuff onto the other end of the tube. He then wraps the splice so formed with a short length of tape, knotting the ends and hangs the tube on the pin 8.

A conveyer now moves the tube along for a sufficient distance so that the spliced joint in the tube has time to become cured and then the wrap and form may be removed, the parts being placed in a container 30. At any point in this operation the valve stem is drawn up through the valve stem hole.

As the conveyer approaches the starting point, a number of operators remove the tubes and apply the spreaders and nuts or other accessories on to the valve stem. For this purpose the tubes may be placed on arm 31 projecting from a table 32. After the nut has been started, it is run down on the valve stem by a motor 33, the shaft of which carries a wrench socket 34.

The tubes are now ready for the final inspection, inflation, and testing, which may be done at any desired point.

By the use of the mechanism shown, tubes may be produced at a greatly reduced cost, the floor space required is reduced over one-third over other systems now in use, and a complete splicing operation is performed in less time and with fewer operators than previously has been possible.

Many of the details of the conveyer may be altered within the province of mechanical skill, and operations may be varied without affecting the scope of the present invention or sacrificing any of its benefits. While the conveyer has been described as continuously operating, it may be intermittently operated if desired and other arrangements may be made for supporting the tubes as they are carried around.

I claim:

1. Apparatus of the character described comprising, a table, a framework arising from the table, a horizontal trackway mounted upon the framework, an endless conveyer suspended from the trackway including vertically disposed slats, co-operating means upon the conveyer and table respectively for guiding the lower edge of the conveyer, and laterally projecting members upon the conveyer arranged in vertical and parallel rows.

2. Conveyer mechanism comprising an endless chain, means for supporting and guiding said chain, a conveyer formed of a plurality of vertical panels suspended from said means so as to travel in their own planes, and laterally extending supports from said panels arranged in vertical rows on said panels.

3. Conveyer mechanism comprising an endless chain, means for supporting and guiding said chain, a conveyer formed of a plurality of vertical units joined together so as to travel in their own planes, and laterally extending pins arranged in vertical rows on said units.

MAX H. PADE.